United States Patent
Peirce

(10) Patent No.: US 8,031,981 B2
(45) Date of Patent: Oct. 4, 2011

(54) METHOD AND SYSTEMS FOR GENERATING A SUBSET OF BIOMETRIC REPRESENTATIONS

(75) Inventor: Michael Peirce, Dublin (IE)

(73) Assignee: Daon Holdings Limited, George Town (KY)

(*) Notice: Subject to any disclaimer, the term of this patent is extended or adjusted under 35 U.S.C. 154(b) by 953 days.

(21) Appl. No.: 11/963,297

(22) Filed: Dec. 21, 2007

(65) Prior Publication Data

US 2010/0312763 A1   Dec. 9, 2010

(51) Int. Cl.
*G06K 9/00* (2006.01)
*G06K 9/60* (2006.01)
*G06F 17/30* (2006.01)

(52) U.S. Cl. ........ 382/305; 382/115; 382/209; 382/306; 340/5.52; 340/5.82; 707/723

(58) Field of Classification Search ........... 382/115, 382/181, 209, 305, 306; 340/5.52, 5.82; 707/821, 723; 358/403, 404
See application file for complete search history.

(56) References Cited

U.S. PATENT DOCUMENTS

| | | | | |
|---|---|---|---|---|
| 5,224,173 A * | 6/1993 | Kuhns et al. | ................... | 382/116 |
| 5,493,677 A * | 2/1996 | Balogh et al. | ................. | 382/305 |
| 5,787,232 A * | 7/1998 | Greiner et al. | ................... | 706/47 |
| 5,892,838 A * | 4/1999 | Brady | ........................... | 382/115 |
| 6,067,369 A * | 5/2000 | Kamei | .......................... | 382/125 |
| 6,229,922 B1 * | 5/2001 | Sasakawa et al. | ............. | 382/209 |
| 7,184,579 B2 * | 2/2007 | Mizoguchi | ................... | 382/124 |
| 7,187,787 B2 * | 3/2007 | Milne et al. | .................... | 382/118 |
| 7,203,343 B2 * | 4/2007 | Manasse et al. | .............. | 382/115 |
| 7,236,614 B2 * | 6/2007 | Kuroda et al. | ................ | 382/115 |
| 7,298,931 B2 * | 11/2007 | Kim et al. | ..................... | 382/305 |
| 7,519,237 B2 * | 4/2009 | Gloger et al. | ................. | 382/305 |
| 7,773,784 B2 * | 8/2010 | Boult | ............................ | 382/124 |
| 7,925,650 B2 * | 4/2011 | Obrador et al. | ............... | 707/723 |
| 2001/0017940 A1 * | 8/2001 | Kim et al. | ..................... | 382/162 |
| 2003/0061233 A1 * | 3/2003 | Manasse et al. | ........... | 707/104.1 |
| 2003/0091724 A1 * | 5/2003 | Mizoguchi | ....................... | 427/1 |
| 2005/0157909 A1 * | 7/2005 | Griffin | ......................... | 382/115 |
| 2006/0126904 A1 * | 6/2006 | Lee et al. | ...................... | 382/115 |
| 2006/0222210 A1 * | 10/2006 | Sundaram | ..................... | 382/115 |
| 2007/0075130 A1 * | 4/2007 | Potrykus | ....................... | 235/380 |
| 2007/0185718 A1 * | 8/2007 | Di Mambro et al. | ......... | 704/273 |

(Continued)

FOREIGN PATENT DOCUMENTS

EP   1 477 925 A2   11/2004

(Continued)

OTHER PUBLICATIONS

Zhang et al. "Optimal Thresholding for Key Generation Based on Biometrics" 2004 International Conference on Image Processing, pp. 1-4.*

(Continued)

*Primary Examiner* — Jason M Repko
*Assistant Examiner* — Mia M Thomas
(74) *Attorney, Agent, or Firm* — Kevin McDermott, Esq.

(57) ABSTRACT

A system and method for enabling analysis of enrolled biometric data is presented. A plurality of vectors each having a plurality of score values representative of the relationship between individual ones of the enrolled biometrics with a plurality of biometric representations forming a filter set are described. Judicious use of the vectors enables a filtering of the enrolled biometric data on a dynamic basis.

26 Claims, 2 Drawing Sheets

U.S. PATENT DOCUMENTS

| | | | | |
|---|---|---|---|---|
| 2007/0253624 A1* | 11/2007 | Becker | | 382/225 |
| 2007/0276853 A1* | 11/2007 | Hamza | | 707/101 |
| 2008/0025647 A1* | 1/2008 | Obrador et al. | | 382/305 |
| 2008/0126191 A1* | 5/2008 | Schiavi | | 705/14 |
| 2009/0106820 A1* | 4/2009 | Park et al. | | 726/2 |
| 2009/0199282 A1* | 8/2009 | Tsitkova et al. | | 726/7 |

FOREIGN PATENT DOCUMENTS

| | | | |
|---|---|---|---|
| WO | WO 2006/044917 | * | 4/2006 |

OTHER PUBLICATIONS

Ko et al. "Monitoring and Reporting of Fingerprint Image Quality and Match Accuracy for a Large User Application" Proceedings of the $33^{rd}$ Applied Imagery Pattern Recognition Workshop (AIPR'04) pp. 1-6.*

Bailly-Baillire et al. "The BANCA Database and Evaluation Protocol" $4^{th}$ International Conference on Audio-Video Based Biometric Person Authentication pp. 1-4.*

* cited by examiner

METHOD AND SYSTEMS FOR GENERATING A SUBSET OF BIOMETRIC REPRESENTATIONS

BACKGROUND OF THE INVENTION

1. Field of the Invention

The present invention relates to biometric filters and in particular to the use of filters in a system and method of generating a subset of enrolled biometric representations from a master database of enrolled biometric representations.

2. Description of the Related Art

The time and computational resources required to perform a biometric 1:N search of a master database comprising a plurality of enrolled biometric representations using a captured biometric representation can be prohibitively expensive. Increasing the number of independent biometric representations in the master database increases the length of time required to perform the search. A 1:N search is typically performed using a complex biometric matching algorithm by comparing a captured biometric data representation against each of the enrolled biometric representations in the master database. A numerical score is generated for each comparison and the enrolled biometric representations in the master database corresponding to the top-ranking scores are returned as the search results.

Filters are used to reduce the searching time by discarding those enrolled biometric representations which are unlikely to subsequently successfully match against the captured biometric representation. Biometric filters known heretofore are based on modality-specific features extracted from each enrolled biometric representation of the master database which can be quickly compared. For example, a known filtering technique with fingerprints is based on the high-level overall pattern formed by the flow of ridges in the fingerprint which are assigned to one of several classes, such as by using the Henry classification system. Other example finger-based filter techniques are based on the location of the core and delta points, the thickness of finger ridges, the number of ridges between specific locations, or the spatial relationships between specific points.

Filters known heretofore have reduced the length of time required to perform a search. However, since each filtering technique requires the extraction and comparison of modality-specific features, they are highly specific to certain environments, modalities, and biometric instances and cannot be used across multi-biometric databases.

Known arrangements relate to pre-assigning the biometrics to one of a number of available bins of like biometrics and then only searching the presented biometric against that specific bin. This requires an a priori classification of the biometrics and suffers in the same way as any statistical binning arrangement in that the usefulness of the final search will depend on the accuracy of the initial binning decision.

BRIEF SUMMARY OF THE INVENTION

These and other problems are addressed by providing a method and system for generating a subset of enrolled biometric representations from a master database of enrolled biometric representations prior to comparing modality-specific features. Such a system and methodology enables an analysis of enrolled biometric data. A plurality of vectors may be generated, each having a plurality of score values representative of the relationship between individual ones of the enrolled biometrics with a plurality of biometric representations forming a filter set. In accordance with the teaching of the present invention, it is possible to judiciously use the vectors to enable a filtering of the enrolled biometric data on a dynamic basis.

These and other features will be better understood with reference to FIGS. 1 and 2 and the following description which are provided to assist in an understanding of the teaching of the invention and not intended to be construed as limiting in any fashion.

BRIEF DESCRIPTION OF THE DRAWINGS

The present application will now be described with reference to the accompanying drawings in which.

DETAILED DESCRIPTION OF THE INVENTION

Figure 1:
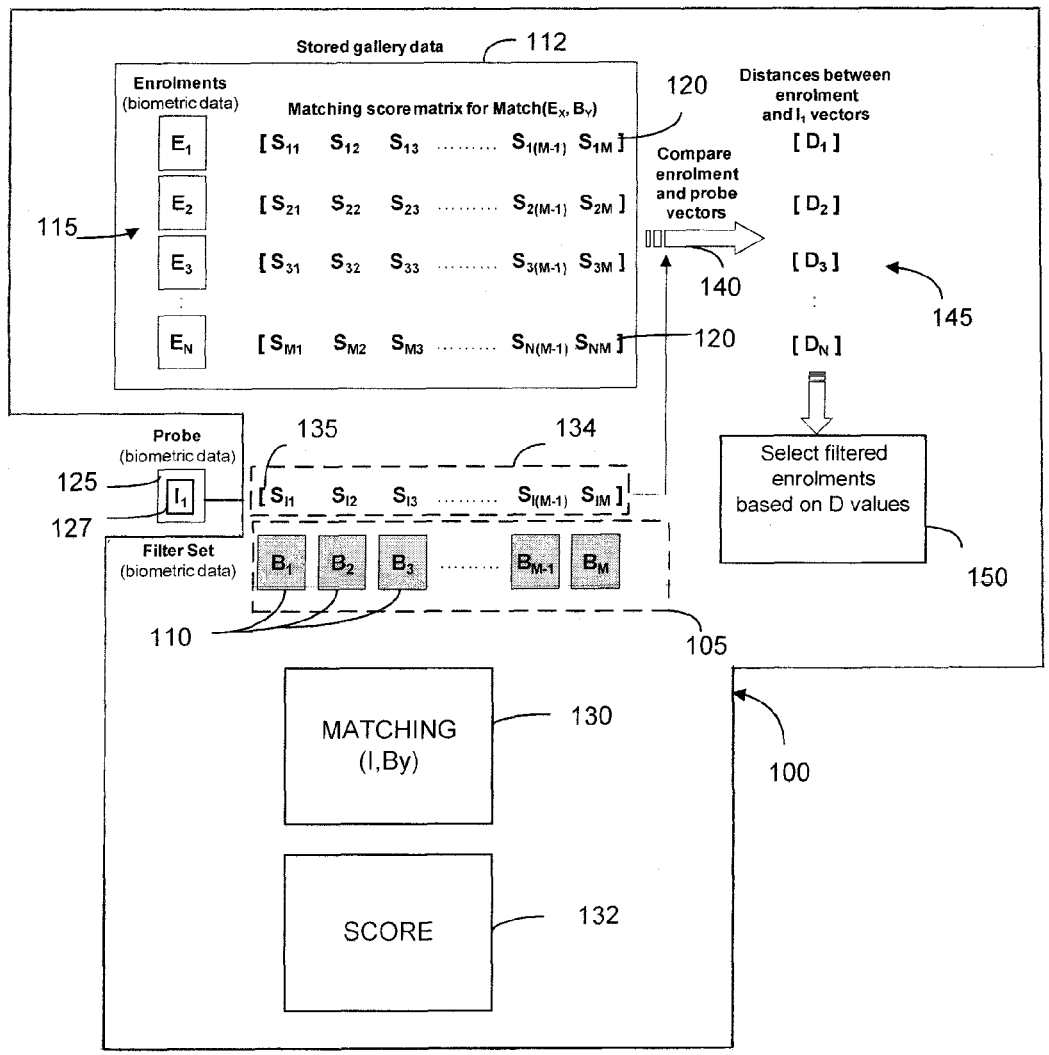
FIG. 1 is a block diagram of a system which implements a method for generating a subset of enrolled biometric representations from a master database of enrolled biometric representations.

The invention will now be described with reference to an exemplary system 100 which implements a method of generating a subset of enrolled biometric representations from a master database or gallery of N enrolled biometric representations 115. The subset is desirably representative of those enrolled biometrics 115 that are most likely to provide a match for a presented biometric 127 be that as part of an open 1:N or closed 1:N search criteria. Using the teaching of the present invention it is possible to provide the subset on a per request basis such that the subset is dynamically generated depending on the specifics of a presented biometric 127. In accordance with the teaching of the invention it is possible to improve the speed of a biometric 1:N search by applying a generic filtering technique that utilizes pre-computed vectors 120 of comparison scores derived by comparing gallery biometric data 115 against a pre-selected filter set 105. In a preferred arrangement, the distance between each gallery score vector 120 and a probe score vector 135 is used to select a subset of candidates for further searching. Unlike previous techniques, the method is not limited to a specific biometric modality. The technique can be used with any biometric modality and leverages any existing matching algorithm for that modality that produces a well-distributed score.

In order to provide this architecture of pre-computed vectors, it is necessary to first define a filter set 105. The system 100 comprises a first data structure, namely, a master database for storing at least one filter set 105 comprising a plurality of biometric representations 110. The first data set 105 is populated with a group of biometric data 110 that is first selected as a filter set 105, using one or more techniques described below. The biometric data 110 in the filter set 105 may consist of raw biometric samples, images, templates, or a combination of these. The filter set 105 may be user defined or in an alternative approach the filter set 105 could be provided by a third party service provider. The importance of the filter set 105 within the context of the teaching of the present invention is that it enables the generation of vectors 120 for the enrolled biometric representations 115, each of the vectors 120 comprising a number of scores comparable in number to the number of biometric representations 110 within the filter set 105. The vectors 120 provide a biometric agnostic or non-specific representation of a relationship between a biometric representation 115 and a filter set 105.

The present invention provides for the formation of filter sets 105 in a number of different approaches. For example, the filter set 105 could be derived exclusively or non-exclusively from biometric representations from the master database of enrolled biometric representations 115. Another approach which although computationally expensive provides a highly efficient technique is to adopt a brute force empirical search of a given dataset. Yet another technique which similarly to the previously mentioned techniques does not have to be done in an exclusive fashion is to derive the filter set 105 from biometric error rate data.

It is possible to generate the filter set 105 from biometric data of the same modality. Within a specific modality, the filter set 105 may contain data from the same biometric instance (e.g. same finger) or from different instances (e.g. multiple types of fingers). Filter sets 105 for other multi-biometric data is described later.

As was mentioned above, the present invention provides for many possible methods to select an appropriate filter set 105. These include but are not limited to one or more of the following:

- By brute-force empirical search. For a given dataset, divided into gallery and probe data, the filter accuracy results using every combination of filter set content for specific sized sets (number of elements) is computed. Due to the number of potential combinations and comparisons performed this may be a compute intensive exercise, which needs to be balanced by limiting the size of the dataset and the number of filter elements allowed. The selected dataset should be representative of the target deployment population and of sufficient size to allow statistical confidence in the accuracy results.
- By repeated random selection search. For a given dataset, divided into gallery and probe data, the filter accuracy results using random combinations of filter set content for specific sized sets (number of elements) is computed. Those filter sets yielding the best overall accuracy are selected.
- By use of regression analysis, extrapolation, interpolation, and other mathematical curve-fitting techniques to optimize selection of the best-fit filter set
- From one or more of the following examples of use of biometric error rate data:
  - By use of minimum false non-match (FNM) data. A FNM occurs when two samples from the same individual which should match when compared fail to meet a specific matcher threshold. In this approach the filter set is selected to consist of data that produces the minimum number of FNMs at a specific matcher threshold using traditional 1:1 matching. A biometric analysis toolkit that compares two datasets and generates matching scores may be utilized to help identify minimum FNM data.
  - By use of minimum false match (FM) data. A FM occurs when two samples from different individuals that should not match when compared does incorrectly meet a specific matcher threshold. In this approach the filter set is selected to consist of data that produces the minimum number of FMs at a specific matcher threshold using traditional 1:1 matching. A biometric analysis toolkit may be utilized to help identify minimum FM data.
  - By use of both minimum combined FNM and FM data. The filter set is selected to consist of data, where each piece of data had a minimal FNM and FM error rates.
  - By use of combined minimum FNM and FM data. The filter set is selected to consist of a mix of data, where some of the data achieved minimal FNM and some of the data achieved minimal FM error rates. Different percentage combinations may be used. This is different than the non-mixed previous approach.
  - By use of maximum false non-match (FNM) data. In this approach the filter set is selected to consist of data that produces the maximum number of FNMs at a specific matcher threshold using traditional 1:1 matching.
  - By use of maximum false match (FM) data. In this approach the filter set is selected to consist of data that produces the maximum number of FMs at a specific matcher threshold using traditional 1:1 matching.
  - By use of both maximum combined FNM and FM data. The filter set is selected to consist of data, where each piece of data had maximal FNM and FM error rates.
  - By use of combined maximum FNM and FM data. The filter set is selected to consist of a mix of data, where some of the data achieved maximal FNM and some of the data achieved maximal FM error rates.
  - By use of a combination of maximum FM data and minimum FNM data
  - By use of a combination of minimum FNM data and maximum FNM data
  - By use of data from individuals with minimum failure to acquire (FTA) issues. An FTA occurs when a biometric sample of sufficient quality cannot be captured from an individual.
- By quality of the data. Select the filter set based on the quality of the available data, as measured by one or more quality algorithms or experts.
- By demographic data. Select the filter set based on the demographic data associated with the available data. For example, select data that represents the average demographic. Alternatively select data to have a more mixed representation across available demographics (e.g. different ages, different ethnic origins etc.)
- By size of the gallery. The number of elements in the filter set may be selected based in part on the current or envisioned size of the gallery set.
- By random selection. Randomly choose data from that available to form the filter set.
- By combination of any one or more of the above techniques It will be understood from the above that the best filter selection or generation approach will depend on the circumstances of the data being analysed and as a result the above are only provided as examples of illustrative techniques that may be usefully employed within the context of the teaching of the present invention.

The filter set 105 is usefully employed in the generation of vectors 120. To store these vectors 120, a second data structure 112 is provided including information on corresponding vectors 120 for each of the enrolled biometric representations 115. It will be understood that typically this second data structure 112 is implemented in the form of a relational table with pairs of (enrolment identifier, vector), where the enrolment identifier is a link/pointer to the actual enrolment data. In this way, the generated vectors 120 may be stored separately to the master database of enrolled biometrics 115. This serves to maintain integrity between the two data structures but also is advantageous with regard to storage requirements, and has benefits in distributed database architectures. It will be understood that such an arrangement is typically advantageous in environments where subsequent to computation of the vectors 120 for each of the enrolled biometrics 115, that the enrolled biometrics 115 are no longer required within the context of the implementation of the filter scheme. However, it will be also understood that such a relational data structure is not essential within the context of the teaching of the present invention in that the second data structure 112 may also be implemented in the form where each of the plurality of enrolled biometric representations 115 and their corresponding vectors 120 are stored.

A specific benefit of the teaching of the present invention lies in the ability to efficiently conduct a 1:N search of the database of enrolled biometrics 115. As part of this search it is necessary to provide a probe or test biometric 127. This can be provided directly from a biometric capturing device 125 which is interfaced to the system and provides for capturing biometric data 127 personal to a user, for example, an iris image or a finger print image. It will be understood within the context of the teaching of the present invention that where referenced as a biometric capture device 125 that it is not intended to limit the application of the present invention to any one modality of biometric and indeed the capture device 125 could be capable of capturing a plurality of biometrics of the same or different modalities. The biometric capturing device 125 is operable for generating a biometric representation 127 of the captured biometric. However it will also be understood that the presented probe biometric 127 need not be directly captured by the system of the present invention in that third parties could independently capture the probe biometrics 127 and then present them to a system provided in accordance with the teaching of the invention. Once received, either directly from the capture device 125 or from a third party, a software matching module 130 is programmed to implement a matching algorithm for matching the biometric representation 127 against the biometric representations 110 of the filter set 105. A software scoring module 132 is co-operable with the matching module 130 for scoring the matching performed by the matching module 130. It will be understood that the functionality of the matching and scoring modules could be integrally provided as part of the same module or could be separated as is illustrated here. The use of different reference numerals will be understood as simply referring to separate activities that are effected and is not intended to limit the teaching of the present invention to any one specific hardware or software architecture. It will be understood that within the context of biometric authentication systems that such comparison and generation of scores is known in a single function from elements such as SDKs as provided by any number of biometric SDK vendors.

A vector generating module 134 is provided for generating a vector (V) 135 comprising the scores generated by the scoring module 132. It will be understood that each of the vectors 135 define an ordered list of match scores, individual ones of the match scores identifying the similarity of the biometric representation 127 to individual ones of the biometric representations 110 of the filter set 105. A comparing module 140 is programmed to implement a comparing algorithm for comparing the vector 135 generated by the vector generating module 134 against each vector 120 associated with each of the enrolled biometric representations 115. A subset generating module 150 is provided for generating the subset based on the comparison performed by the comparing module 140. The subset may be a list of identifiers or indexes pointing to the corresponding enrolment data, or it may contain the actual enrolment data or derivative thereof.

Figure 2:
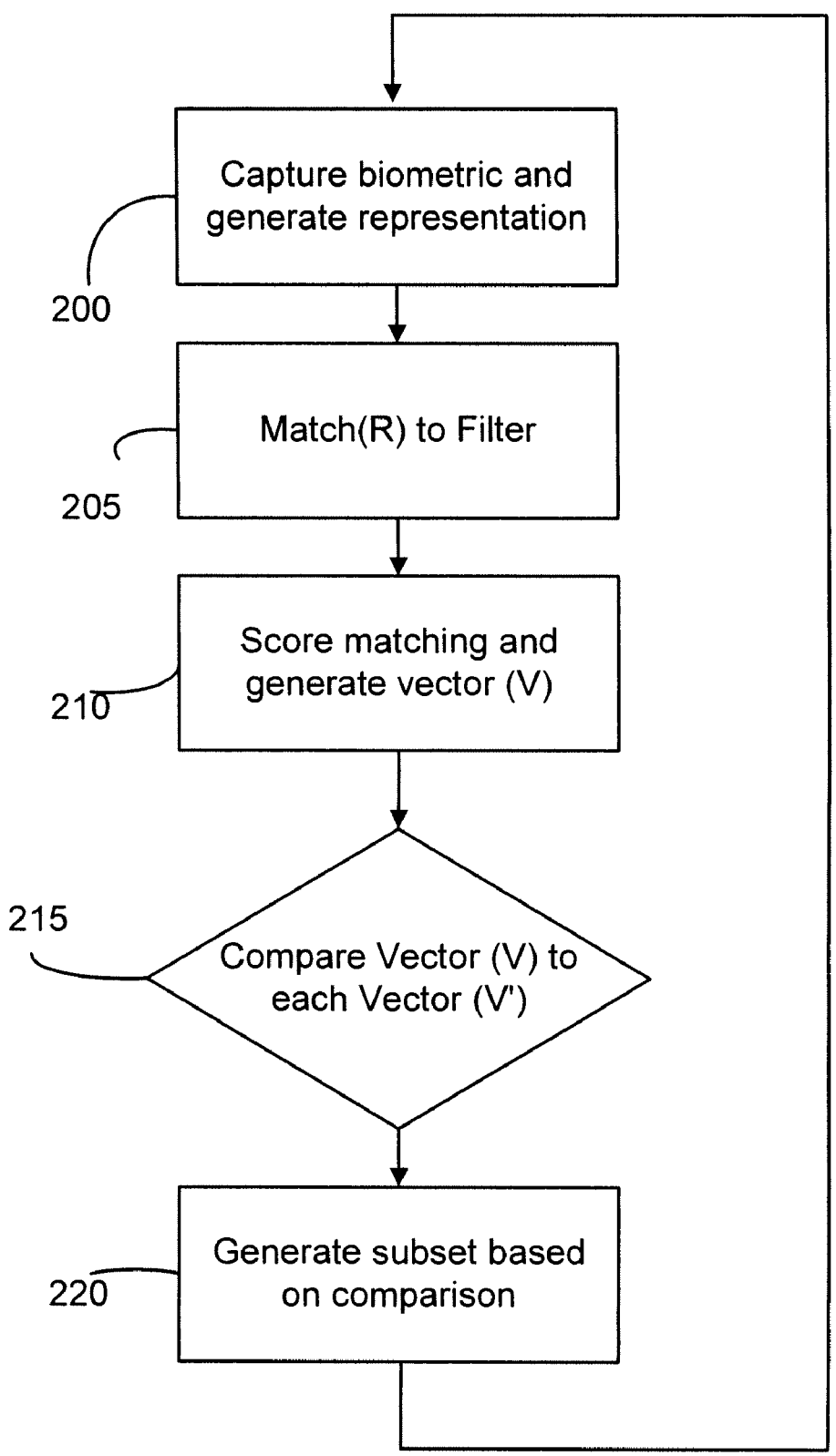
FIG. 2 is a flow chart illustrating the method of FIG. 1.

Referring now to the flow chart of FIG. 2 an exemplary operation of the system 100 of FIG. 1 is illustrated. At block 200 the biometric capture device 125 captures a biometric of a subject and generates the biometric representation 127 thereof. The biometric representation 127 may be in the form of an image or a template or in any other suitable format which can be used to represent a biometric. Once the biometric representation 127 is generated, the matching module 130 in block 205 matches the biometric representation 127 derived from the captured biometric to the filter set 105 comprising the plurality of biometric representations 110. At block 210 the scoring module 132 scores the matching of block 205 and generates a vector 135 comprising the scores. Once the vector 135 is complete, the comparing module 140 in block 215 compares the vector 135 generated in block 210 against each of the enrolment vectors 120 associated with the corresponding enrolled biometric representations 115 stored in the second data structure 112. It will be understood that the vectors 120 were typically generated in a similar manner as the vector 135, as discussed above in connection with blocks 200, 205, and 210. At block 220 the subset generating module 150 generates the subset based on the results of the comparison carried out in block 215.

In this example, each vector comparison performed by the comparison module 140 in block 215 results in a distance or correlation score 145, representing the magnitude of difference between the vector 135 and each of the vectors 120. The lower the distance score the closer the values of the two compared vectors are. Biometric representations that originate from the same user will, it will be appreciated, exhibit smaller inter-vector distances than biometrics representations derived from different users. The subset generating module 150 is configured for determining which of the enrolled vectors 120 are within a definable threshold of the tested biometric 127 on the basis of the vector computation. This output may result in identification of a plurality or a percentage of the closest vector matches or those that exhibit a distance below a specific distance threshold, and the classification of that subset into the subset. It will be appreciated that this subset represents a proportion of the enrolled biometrics 115 and based on the vector analysis it is probable that the ultimate match for the presented biometric 127 will be derived from this subset.

This subset can then be used in a variety of different ways. For example, traditional complex 1:1 biometric matching, or other known matching or filtering techniques may be performed on the filtered subset which contains substantially less biometric representations compared 115 to the secondary database 112. The method of generating the subset as described above may be implemented using any traditional programming language, and only requires a traditional biometric matching algorithm to generate vector scores.

Alternatively, instead of directly implementing the vector creation and vector comparison routines, a text-based search engine may be leveraged to perform these tasks. The generated filters can be adapted for use with a text-based search engine by quantizing the values of scores. Instead of using actual raw matching scores, the score values are normalized into a smaller number of score groupings. For example, for an algorithm that produces scores distributed between 0 and 10,000, the score space may be divided into 50 groups each with a score range of 200. Each score group is given a textual representation, such as G1, G2, G3 and so on. A filter vector will now consist of an ordered string of these textual score groups, rather than a sequence of raw match scores.

Instead of performing vector distance computations as described in block 215, comparison may be based on textual comparisons of the strings of score groups. Typically, each string of score groups will have a static length, corresponding to the number of elements in the original filter set 105. Comparisons may be performed by a highly efficient text-based search engine, which will return the biometric representations 115 which are within the comparison criteria.

Heretofore operation of a system and methodology provided in accordance with the teaching of the present invention has been described with reference to single biometrics and single filters. A number of filter sets 105 may be produced using one or more of the techniques outlined above. Depending on characteristics of the input 1:N search probe or other configurable conditions, the filter set 105 to apply may be dynamically selected at search time. The enrolment filter vectors 120 for all of the several possible filter sets 105 are typically generated beforehand. At search time, the probe filter vector is generated for the selected filter set 105, and filtering takes place. In a similar fashion to how the term filter should be considered in both singular and plural, the term biometric as used herein is intended to define both single and multiple biometrics. In this way, it will be understood that individual ones of the biometric representations referred to above may relate to multiple biometrics. By this is meant that the multiple biometrics may relate to one or more of:

multi-presentation whereby the same biometric instance is presented multiple times;

multi-instance whereby different instances of the same biometric modality is presented;

multi-modal wherein different modalities of biometric are presented;

multi-sensor wherein two or more different capture devices are used to effect capture of the biometric representations;

multi-algorithm where two or more different feature extraction algorithms are used to generate the biometric representations from captured biometric images In this context a 1:N identification search may use more than one instance (multi-instance) of a biometric, such as when multiple different fingers from the same individual are searched against a multi-finger gallery. Similarly, a 1:N identification search may use more than one biometric modality (multi-modal), such as when a finger image and an iris image from the same individual are searched against a gallery containing both finger and iris biometrics.

The teaching of the invention may also be applied to multi-biometric scenarios including multi-instance, multi-modal, multi-sample, multi-algorithm, multi-sensor, and any combination of these.

In a multi-modal scenario, a separate filter set 105 may be constructed for each different modality. For example, a filter set 105 would be created for finger and a second filter set for iris images. A finger matching algorithm and an iris matching algorithm are used to generate scores for the respective two separate score vectors. The two separate score vectors (one for finger, one for iris) may be combined, such as by concatenation, to form a single logical vector, which is then compared with other similar vectors as before.

Alternatively, the two modality-specific vectors, derived from matching with the separate modality-specific filters, may be compared separately and the vector results fused using appropriate normalization and fusion techniques. This second approach allows a greater weighting to be placed on one or more of the vectors, and hence modalities. For example, the vector distance score for the iris part might be given more importance, a greater weighting, when it is combined with the vector distance score for the finger part.

In a multi-instance scenario, a single filter set 105 may be used, regardless of the instance type of the input. Alternatively, as with the multi-modal scenario, a different filter set 105 may be assigned for each instance type. For example, one filter set 105 can be defined for index fingers and another more appropriate filter set 105 defined for use with thumbs. As with the multi-modal scenario, this can then lead to a single logical vector or separate vector comparisons.

The same options exist for multi-sensorial, multi-sample, and multi-algorithm scenarios. For example, a different filter set 105 might be created for each input sensor, such as a filter set 105 for finger images captured from a silicon-based sensor, and a second filter set 105 for those captured from an optical sensor. The same options are present for multi-sample (multiple images of the same instance from the same individual) and multi-algorithm (different matching algorithms for comparing the same modalities).

It will be understood that what has been described herein are exemplary embodiments of a system and methodology implementing a generic filter arrangement that may be usefully employed in generation of a subset of a master database of enrolled biometrics 115 for searching/analysis purposes. Such a system and methodology employs a plurality of vectors 120 each having a plurality of score values representative of the relationship between individual ones of the enrolled biometrics 115 with a plurality of biometric representations 110 forming a filter set 105. Judicious use of the vectors enables a filtering of the enrolled biometric data 115 on a dynamic basis. While the present invention has been described with reference to exemplary arrangements and diagrams it will be understood that it is not intended to limit the teaching of the present invention to such arrangements as modifications can be made without departing from the spirit and scope of the present invention. In this way it will be understood that the invention is to be limited only insofar as is deemed necessary in the light of the appended claims.

Furthermore, the words comprises/comprising when used in this specification are to specify the presence of stated features, integers, steps or components but does not preclude the presence or addition of one or more other features, integers, steps, components or groups thereof.

The invention claimed is:

1. A method of filtering a master database of enrolled biometric representations to generate a subset of enrolled biometric representations against which a presented biometric is authenticated, said method comprising:

matching individual enrolled biometric representations included in the master database of enrolled biometric representations against a filter set and generating a score for each of the matches, the filter set including a plurality of biometric representations;

generating vectors of the scores for each of the matched enrolled biometric representations;

associating the individual enrolled biometric representations with a corresponding generated vector; and using the generated vectors in an authentication request to determine a subset of the enrolled biometric representations against which a presented biometric is authenticated.

2. The method of claim 1 wherein the subset of enrolled biometric representations is generated on a dynamic basis for each authentication request.

3. The method of claim 1, the authentication request comprising:

receiving a biometric representation of a user;

matching the received biometric representation against the filter set and generating a set of scores for the matches;

generating a vector of the scores for the received biometric representation;

comparing the vector for the received biometric representation with the vectors of the enrolled biometric representations; and using the results of the comparison to determine the subset of the enrolled biometric representations against which the received biometric representation are to be tested.

4. The method of claim 3 wherein the received biometric representation is received from a biometric capture device.

5. The method of claim 3 wherein the received biometric representation is received from a third party application which effected capture of the biometric representation.

6. The method of claim 3, said comparing operation generating a plurality of vector comparison values, each of which indicates the level of similarity between the received biometric representation with an individual enrolled biometric representation.

7. The method of claim 6 further comprising applying a threshold factor to the plurality of vector comparison values to determine which of the enrolled biometric representations are used to form the subset.

8. The method of claim 1 wherein individual biometric representations relate to multiple biometrics.

9. The method of claim 8 wherein the multiple biometrics relate to at least one of:
- multi-presentation whereby the same biometric instance is presented multiple times;
- multi-instance whereby different instances of the same biometric modality is presented;
- multi-modal wherein different modalities of biometric are presented;
- multi-sensor wherein two or more different capture devices are used to effect capture of the biometric representations; and
- multi-algorithm where two or more different feature extraction algorithms are used to generate the biometric representations from captured biometric images.

10. The method of claim 1 wherein each of the generated vectors define an ordered list of match scores, each of the match scores identifies the similarity of the biometric representation to an individual biometric representations of the filter set.

11. The method of claim 10 wherein the plurality of match scores are provided in a numerical format, said method further comprising translating the numerical format into a text format to provide for subsequent text searching.

12. The method of claim 1 wherein the master database includes a number of databases each being distinguished by the biometric stored.

13. The method of claim 1 further comprising storing the generated vectors separately from the master database.

14. The method of claim 1 wherein the generated vectors provide a representation of a relationship between an individual enrolled biometric representation and the filter set.

15. The method of claim 1 further comprising generating different vectors for different biometrics.

16. The method of claim 15, said generating different vectors operation comprising using multiple filters, each filter being appropriate to a specific biometric.

17. The method of claim 15 further comprising combining vectors of different biometrics into a single vector representative of a multiple biometric.

18. The method of claim 15 wherein on presentation of an authentication request containing multiple biometrics, individual multiple biometrics are matched against appropriate filter sets such that for each biometric and filter match a set of scores is created, the multiple sets of scores being used in the generation of multiple vectors, each of the multiple vectors being used in the selection of the subset.

19. The method of claim 18 wherein the multiple vectors are combined prior to comparison with combined multiple enrollment vectors.

20. The method of claim 18 wherein the multiple vectors are compared against multiple vectors of the enrolled biometric representations to provide a preliminary set of vector comparison scores.

21. The method of claim 20 further comprising weighting individual scores of the preliminary set of vector comparison scores prior to combining the preliminary set of vector comparison scores to provide a vector comparison score.

22. The method of claim 21 wherein the number of weightings used is related to the number of biometrics within the multiple biometric.

23. The method of claim 1 wherein the filter is derived exclusively from enrolled biometric representations from the master database.

24. The method of claim 1 wherein the filter is derived from enrolled biometric representations from the master database.

25. The method of claim 1 wherein the filter is derived from a brute force empirical search of a given dataset.

26. The method of claim 1 wherein the filter is derived from biometric error rate data.

* * * * *